(12) United States Patent
Ladewig et al.

(10) Patent No.: US 9,533,282 B2
(45) Date of Patent: Jan. 3, 2017

(54) GAS SEPARATION PROCESSES (71) Applicants: Commonwealth Scientific and Industrial Research Organisation, Campbell, Australian Capital Territory (AU); Monash University, Clayton, Victoria (AU)

(72) Inventors: Bradley Ladewig, St Kilda East (AU); Richelle Lyndon, Point Cook (AU); Matthew Hill, Pascoe Vale South (AU)

(73) Assignee: Commonwealth Scientific and Industrial Research Organisation (AU)

( * ) Notice: Subject to any disclaimer, the term of this patent is extended or adjusted under 35 U.S.C. 154(b) by 40 days.

(21) Appl. No.: 14/416,405

(22) PCT Filed: Jul. 26, 2013

(86) PCT No.: PCT/AU2013/000831
§ 371 (c)(1),
(2) Date: Jan. 22, 2015

(87) PCT Pub. No.: WO2014/015383
PCT Pub. Date: Jan. 30, 2014

(65) Prior Publication Data
US 2015/0190784 A1 Jul. 9, 2015

(30) Foreign Application Priority Data
Jul. 26, 2012 (AU) .................................. 2012903210

(51) Int. Cl.
*B01D 53/02* (2006.01)
*B01J 20/28* (2006.01)
(Continued)

(52) U.S. Cl.
CPC ............ *B01J 20/3441* (2013.01); *B01D 53/02* (2013.01); *B01D 53/04* (2013.01); *B01J 20/226* (2013.01);
(Continued)

(58) Field of Classification Search
CPC ... B01D 53/02; B01D 53/04; B01D 2253/204; B01D 2257/504; B01D 2259/40083; B01J 20/226; B01J 20/28011; B01J 20/3425; B01J 20/3433; B01J 20/3441; Y02C 10/08
(Continued)

(56) References Cited

U.S. PATENT DOCUMENTS 7,985,868 B1 * 7/2011 Bauer .................... C09K 11/04
549/523
8,715,395 B2 * 5/2014 Omary ................... B01D 53/02
548/101

(Continued)

FOREIGN PATENT DOCUMENTS

| WO | 2007111738 | 10/2007 |
|---|---|---|
| WO | 2010133891 | 11/2010 |

OTHER PUBLICATIONS

Park et al., "Reversible Alteration of CO2 Adsorption Upon Photochemical or Thermal Treatment in a Metal-Organic Framework" Journal of the American Chemical Society, vol. 134, 2012, pp. 99-102.
(Continued)

*Primary Examiner* — Frank Lawrence
(74) *Attorney, Agent, or Firm* — Tarolli, Sundheim, Covell & Tummino LLP (57) ABSTRACT

A process for the separation of a gas from a gas stream using metal organic framework that is reversibly switchable between a first conformation that allows the first gas species
(Continued)

to be captured in the metal organic framework, and a second conformation that allows the release of the captured first gas species, using light as the switching stimulus. The metal organic framework may comprise a metal and one or more ligands, in which the ligands contain an isomerizable group within the molecular chain that forms a link between adjacent metal atoms in the metal organic framework.

29 Claims, 8 Drawing Sheets

(51) Int. Cl.
  *B01J 20/34* (2006.01)
  *B01J 20/22* (2006.01)
  *B01D 53/04* (2006.01)
(52) U.S. Cl.
  CPC ....... *B01J 20/28011* (2013.01); *B01J 20/3425* (2013.01); *B01J 20/3433* (2013.01); *B01D 2253/204* (2013.01); *B01D 2257/504* (2013.01); *B01D 2259/40083* (2013.01); *Y02C 10/08* (2013.01)
(58) Field of Classification Search
  USPC ...... 95/139, 148; 423/230; 206/0.7; 502/401
  See application file for complete search history.

(56) References Cited

U.S. PATENT DOCUMENTS

| 2010/0282080 | A1 | 11/2010 | Omary et al. | |
|---|---|---|---|---|
| 2012/0070904 | A1* | 3/2012 | Stoddart | B01J 20/226 436/133 |
| 2014/0033920 | A1* | 2/2014 | Tate | B01D 53/02 95/139 |

OTHER PUBLICATIONS

Jinhee Park et al.; Reversible Alteration of CO2 Adsorption upon Photochemical or Thermal Treatment in a Metal-Organic Framework; Journal of the American Chemical Society; 2012, 134, pp. 99-102.
Banglin Chen et al.; A Triply Interpenetrated Microporous Metal-Organic Framework for Selective Sorption of Gas Molecules; Inorganic Chemistry Communication; 2007, 46, pp. 8490-8492.
Nobuhiro Yanai et al.; Guest-to-Host Transmission of Structural Changes for Stimuli-Responsive Adsorption Property; Journal of the American Chemical Society; 2012, 134, pp. 4501-4504.
Antje Modrow et al.; The first porous MOF with photoswitchable linker molecules; Dalton Transactions; 2011, 40, pp. 4217-4222.
Antje Modrow et al.; Systematic Investigation of Porous Inorganic-Organic Hybrid Compounds with Photo-Switchable Properties; Z. Anorg. Allg. Chem. 2012, 638, pp. 2138-2143.
Supplementary European Search Report for EP 13 82 3026 dated Feb. 16, 2016.

* cited by examiner

GAS SEPARATION PROCESSES

FIELD

The present application relates to gas separation processes, such as processes for the separation or removal of carbon dioxide from other gases in a gas stream. The present application therefore has particular application in the area of post-combustion carbon dioxide capture technology.

BACKGROUND

In order for post-combustion carbon dioxide capture technology to realize widespread viability, the energy cost of this technology must be drastically reduced. Current adsorbent technologies that rely on pressure, temperature or vacuum swing adsorption consume as much as 40% of the power plant's production capacity, most of which is associated with the liberation of the $CO_2$ from the capture medium. Ultimately this penalty, or parasitic energy load, must be brought closer to the thermodynamic minimum of about 4% to avoid prohibitive cost increases. Given that the triggers for release of adsorbed carbon dioxide are so energy intensive and are based on energy from the power plant, there is strong motivation to develop new, low energy release triggers, utilising renewable energy sources. In conjunction with this, adsorbents with maximum performance can further reduce the cost compared to the conventional energy intensive $CO_2$ gas separation process.

A range of different types of materials have been considered for use in separation materials for the separation of selected gases, and notably $CO_2$ from a gas stream. Materials include porous organic polymers and metal-Organic Frameworks (MOFs), amongst others. MOFs are an important class of 3D crystalline porous materials comprised of metal centres and organic ligands, joined periodically to establish a crystalline porous array. The large internal surface areas can be used to adsorb large quantities of gases, such as hydrogen, methane and carbon dioxide.

Methods for the incorporation of light responsive groups within MOFs include use of pendant groups pointing into the pores, and filling of pores with light responsive guest molecules. The responsive groups within these materials may then change their conformation when exposed to filtered light which results in a change in adsorption capacity (in static conditions). Whilst these initial results are exciting, there are inherent limitations in the approaches reported to date. Firstly there is a requirement for specific wavelengths of light to trigger the conformational change. Second, the mode of regeneration in materials studied to date has involved mechanisms that take considerable time to achieve removal of the adsorbed species. Some mechanisms require the application of considerable energy in the form of heat.

An adsorbent that can respond to a broad light spectrum similar to solar radiation, and/or possess relatively fast photo-switching that directly releases $CO_2$ would offer enhanced, lower energy routes to light-triggered $CO_2$ release.

SUMMARY

According to the present invention, there is provided a process for the separation of a first gas species from a gas stream using a gas separation material comprising a metal organic framework that is reversibly switchable between a first confirmation that allows the first gas species to be captured in the metal organic framework, and a second conformation that allows the release of the captured first gas species on the use of light as the switching stimulus, the process comprising:

contacting a gas stream containing the first gas species with the gas separation material comprising the metal organic framework in the first conformation to capture the first gas species, releasing the separated first gas species from the gas separation material by switching the conformation of the metal organic framework to the second conformation, and switching the metal organic framework to the first conformation to regenerate the gas separation material.

The process typically comprises a further step of reusing the regenerated gas separation material for the separation of the first gas species from the gas stream.

The term "light" is used broadly to refer to light from the visible and/or ultraviolet spectrum. The term encompasses either filtered light of a selected wavelength, or unfiltered light, or light having a broad wavelength range (broadband wavelength). According to one preferred embodiment, the light is light of broadband wavelength. According to another embodiment, the light is sunlight, such as concentrated sunlight.

Light, and in particular concentrated sunlight, is an extremely attractive stimulus for triggering $CO_2$ release. For the first time, it has been found that metal organic frameworks of a suitable type that (i) are capable of capturing or adsorbing gases such as $CO_2$, (ii) strongly absorb sunlight which provides a stimulus for reversibly and rapidly changing their conformation, and (iii) adsorb gas or release the adsorbed gas through this conformational change. This process can achieve the required gas uptake and release with low energy cost, as is required for commercially viable gas separation processes. The process allows for reduced reliance on coal as an energy source.

The "use" of light as the switching stimulus encompasses the application and removal of light. According to preferred embodiments, light is the only switching stimulus. Thus, the metal organic framework is one that is reversibly switchable between a first conformation that allows the first gas to be captured in the metal organic framework and a second conformation that releases the captured first gas species on the use of light as the only switching stimulus. It has been found by the present applicants that light is the only switching stimulus for the MOFs of preferred embodiments, so that no additional energy input such as heat application is required.

According to some embodiments, the second conformation is achieved on application of light (e.g. through irradiation of the MOF with light). In this embodiment, the switching of the metal organic framework to the first conformation to regenerate the gas separation material is triggered by removal of light. Thus, in such embodiments, the process comprises the step of:

releasing the separated first gas species from the gas separation material by applying light to switch the metal organic framework to the second conformation and release the captured first gas species.

According to some embodiments, the conformation that is achieved on application of light is a conformation that is under tension, and removal of the light results in spontaneous reversal to the structure of the other conformation. This is an important characteristic of preferred embodiments, as this allows for the rapid reversible change in conformation to be achieved on removal of the light stimulus. As an example, the second conformation may be one that is under tension, and removal of the light results in spontaneous reversal to the first conformation. The first conformation is not under tension. "Rapid" in this context refers to a time period of not more than 30 seconds.

Details of suitable metal organic frameworks that have the properties required for use in the present claimed process are set out in the detailed description below. In general terms, according to some embodiments, the metal organic framework is an interpenetrated metal organic framework. The metal organic framework may be one that is triply interpenetrated, although other degrees of interpenetration are possible.

According to another aspect, there is provided the use of a metal organic framework that is reversibly switchable between a first conformation and a second conformation on the use of light as the switching stimulus, as a gas separation material for the separation of a first gas species from a second gas species in a gas stream through adsorption of the first gas species from the gas stream when in the first conformation, and release of the first gas species through switching to the second conformation. The switching to the second conformation may be through the application of light.

According to a further aspect, there is provided a gas separation device comprising the gas separation material described herein. The gas separation device may be in any suitable form, such as in the form of a gas separation membrane, or a gas separation cartridge.

BRIEF DESCRIPTION OF THE FIGURES

FIG. 6 shows the PXRD of unirradiated (dashed line; top line) and light irradiated (solid line—lower line) $(AzDC)(4,4'-BPE)_{0.5}$. No filter was used when the light source was switched on.

FIGS. 11a and 11b provide a schematic illustration of the process for separating a first gas species from a gas stream using a gas separation material comprising a MOF according to one embodiment, in which FIG. 11a represents the process in the absence of the activating light, and FIG. 11b represents the process when the separating gas species are released from the gas separation material by irradiating the MOF with light.

DETAILED DESCRIPTION

The present application is based on the development of a metal organic framework that was selected based on its potential to have properties making it suitable for use in gas separation materials. A number of surprising features were found to be embodied in the studied metal organic framework, which now guide the selection and development of additional metal organic frameworks having the properties required for use in gas separation materials which rely on light as the (or the only) switching mechanism.

The term "gas separation material" is used in a general sense to refer to a material that enables the required separation of gases. The gas separation material may be in the form of a gas separation membrane, or in the form of a gas separation adsorbant of any physical construction, such as a particulate adsorbant material or otherwise. The gas separation material may form part of a gas separation device, such as a gas separator, gas separation cartridge, or any other device, equipment or apparatus used in the treatment of a gas stream. The gas separation material may consist of the metal organic framework, or the metal organic framework may constitute one component of the gas separation membrane, or gas separation adsorbant.

Metal organic frameworks are a well known class of chemical compounds. Metal organic frameworks comprise metal atoms (or metal centres) and organic ligands that bridge between the metal atoms to establish a crystalline porous array.

One of the ligands that was selected for use in developing the studied metal organic framework is based on azobenzene. Azobenzene and its derivatives are photochromic molecules that can undergo clean and efficient reversible photoisomerisation about the azo bond to cis- and trans-state upon visible and UV light irradiation respectively (coordinated trans-: $\lambda max\sim370$ nm, cis-: $\lambda max\sim460$ nm). Conversion of azobenzene to the 4,4'-dicarboxylate (AzDC) delivers a ligand that can be incorporated into MOF architectures.

A second ligand selected for the studied metal organic framework was the ligand trans-bis(4-pyridyl)ethylene (4,4'-BPE), which has cis-trans photo-isomerisability when coordinated to a metal complex (coordinated trans 4,4'-BPE: $\lambda max\sim280\text{-}310$ nm, coordinated cis 4,4'-BPE: $\lambda max\sim280$ nm). This second ligand is of a class referred to as a "pillar ligand", which is capable of co-ordinating to two metal atoms, to create pillars between two planar metal-ligand arrays.

Figure 1:
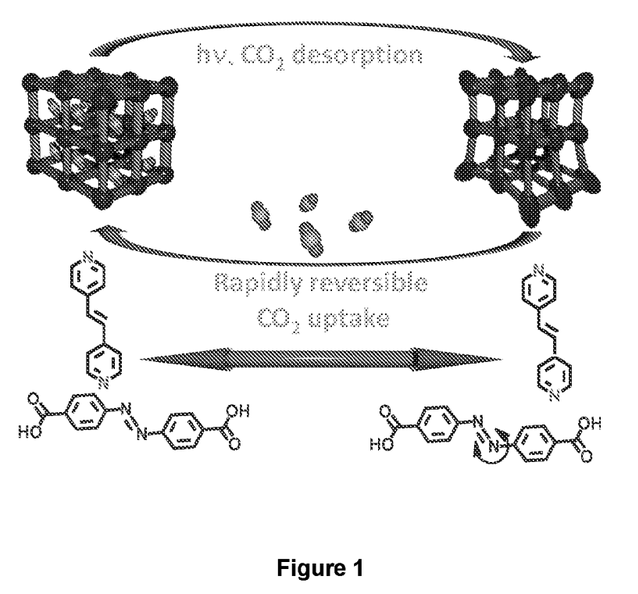
FIG. 1 is a schematic illustration showing dynamic photoswitching in the light responsive MOF of one embodiment, $Zn(AzDC)(4,4'-BPE)_{0.5}$, which leads to rapidly reversible $CO_2$ uptake.

The combination of these two ligands within a zinc-based MOF generates the triply interpenetrated framework $Zn(AzDC)(4,4'\text{-}BPE)_{0.5}$, which exhibits an open topology amenable to high capacity and selective adsorption of hydrogen and carbon dioxide. This is shown schematically in FIG. 1.

The strong photo-response in $Zn(AzDC)(4,4'\text{-}BPE)_{0.5}$ that has been identified for the first time herein, is dynamic and localized in nature, irrespective of the use of broadband or filtered light sources. This unusual property has been able to be exploited to trigger the uptake and release of carbon dioxide in real-time, during adsorption experiments, which demonstrate that gas separation materials comprising such MOFs can be utilised in very cost-effective processes for gas separation. Exposure to UV light resulted in an instantaneous release of up to 69% of the adsorbed $CO_2$ using broadband radiation, similar to concentrated solar sources. Furthermore, the response was found to be fully reversible. The dynamic, yet localized structural movements have been directly characterized with a suite of light and X-Ray based experiments, and isolated to being a factor solely of the UV radiation with several careful control experiments.

Based on the results achieved with $Zn(AzDC)(4,4'\text{-}BPE)_{0.5}$, the applicants have identified a range of variations that can be made on the MOF structure while still achieving the desired performance outcomes that will enable other MOFs to be used in the process of the present application.

$Zn(AzDC)(4,4'\text{-}BPE)_{0.5}$ is an interpenetrated metal organic framework. Specifically, $Zn(AzDC)(4,4'\text{-}BPE)_{0.5}$ is a triply interpenetrated metal organic framework, or in other words, has 3-fold interpenetration. This is a concept that is well understood in the art of the invention. Interpenetration refers to the intersection of independent nets or networks of the basic molecule ($Zn(AzDC)(4,4'\text{-}BPE)_{0.5}$ in this case) each being of the same structure. In the case of 3-fold interpenetration, 3 independent nets or networks intersect each other.

According to preferred embodiments, other MOFs that can be used in the present application are interpenetrated metal organic frameworks. These may have 2-fold, 3-fold, 4-fold or greater degrees of interpenetration. According to one embodiment, the MOF has 3-fold interpenetration.

Other categories of MOFs of the prior art with cavities that may enable the capture and release of gas species rely on a bulky pendant group being tethered to the ligand via an isomerisable functional group (such as an azo group). In such pendant-group containing MOFs, the tethered group projects into a cavity created by the MOF, and out of the cavity when subjected to a stimulus (such as heat stimulus to cause the bulky group to project into the cavity, and light to fold the bulky group out of the cavity). Examples of bulky pendant groups include phenyl rings. The MOFs suited for use in the present application are preferably free of bulky pendant groups.

A further category of MOFs of the prior art with cavities that may enable the capture and release of gas species are guest-host MOFs. These MOFs rely on a 3D host framework which is rigid and does not change conformation on application of a stimulus, containing within the cavities an isomerisable guest molecule which is isomerisable on the application of a stimulus. The guest molecule has one conformation that allows a gas species to fit within the pore with the guest molecule, or another conformation that fills or obstructs the cavity so as to prevent the gas species from being retained within the pore. The MOFs suited for the present application are preferably free of an isomerisable guest molecule.

The MOFs of particular interest in the present application comprise a metal species, and one or more ligands. The metal species may be denoted M.

The metal species may be selected from the group consisting of: Sc, Ti, V, Cr, Mn, Fe, Co, Ni, Cu, Zn, Y, Mg, Ca, Sr, Ba, Zr, Ti and lanthanides (La, Ce, Pr, Nd, Pm, Sm, Eu, Gd, Tb, Dy, Ho, Er, Tm, Yb and Lu), and combinations thereof. According to some embodiments, the metal species is selected from the group consisting of Zn, Y, Mg, Ca, Sr, Ba, Zr, Ti and lanthanides and combinations thereof. In some embodiments the MOF comprises a single metal species. It will be understood that these metals are positively charged, and that the molecule will include a counterion or counterions for charge balancing.

The MOF preferably comprises at least one ligand containing an isomerisable group within the molecular chain that forms a link between adjacent metal atoms in the MOF. This accordingly excludes ligands containing a pendant groups attached via an isomerisable group (such as an azo group). Examples of such ligands are azo benzene 4,4' dicarboxylate (AzDC) and 4,4'-bipyridyl ethene (BPE). The concept of the requirement that there be "an isomerisable group within the molecular chain that forms a link between adjacent metal atoms in the MOF" is explained by reference to these examples. In these examples, the isomerisable azo (—N=N—) or ethene (—CH=CH—) group, respectively, form a part of the main chain through which adjacent metal atoms are attached through co-ordination of the ligand to the metal atoms.

The MOF is capable of a conformational change between a first conformation and a second conformation. The conformational change is a structural change in the molecule. Structural change refers to a change in the relative locations of atoms in the MOF. One example is a change from a cis-isomer to a trans-isomer, or vice versa. Other examples of structural changes are ring opening/ring closing rearrangements of atoms and other structural movements within ring systems, such as conversions between chair and boat ring system configurations. The component of the MOF that changes conformation is the ligand component of the MOF.

The ligand undergoing a conformational (i.e. structural) change, such as isomerisation, suitably involves a structural change or isomerisation within the length of the molecule.

In some embodiments, the MOF comprises a photochromic ligand. Photochromic materials are materials that change colour on exposure to light. Photochromic materials commonly provide a colour change effect by undergoing a structural or electronic change on exposure to light. Correspondingly, a photochromic ligand is a photochromic material that is in the form of a ligand. Ligand is a term well understood in chemistry and in this context refers to a molecule that co-ordinates to a metal atom by way of donating electrons to free orbitals of the metal atom. The ligands of particular interest are bidentate or polydentate.

There may be one or more photochromic ligands in the MOF. Examples of photochromic ligands include azobenzenes, triarylmethanes, stilbenes, azastilbenes, nitrones, fulgides, spiropyrans, napthopyrans, spiro-oxazines and quinines.

In some embodiments, the MOF comprises one or more ligands containing one or more of the following isomerisable groups:
- azo (—N═N—),
- ethene (—C═C—),
- aza (—N═C—),
- nitrone (—C═N$^+$(O$^-$)—),
- polyene group capable of a ring closing/opening reaction, a specific example of which is a diaryl ethenes, a class which includes fulgides,
- two heterocyclic groups joined by a spiro-carbon atom, capable of ring opening and closing, of which spiropyrans and spirooxazines are examples, and
- a chiral carbon atom (which may be chiral in the free ligand, or only when coordinated to one or more metal atoms, of which triarylmethane is an example).

The above isomerisable groups are suitably within the molecular chain of the ligand. This language excludes isomerisable groups that are pendant to the main chain of the ligand. To establish whether a group is within the molecular chain of the ligand, one can trace through the atoms from one end (co-ordinating to the metal atom) to the other, and provided the isomerisable group (or part of the isomerisable group) must be passed through in at least one route between the ends, then the isomerisable group forms part of the molecular chain.

In some embodiments, the MOF comprises two ligands, each containing an isomerisable group within the molecular chain. The form of isomerisation may be a cis-trans isomerisation or any other isomerisation that results in a structural change (a conformation change) in the MOF, as described previously.

In some embodiments, the MOF comprises one or more ligands containing a photoisomerisable azo or ethene bond enabling reversible isomerisation between the cis- and trans-state. The azo or ethene bond is suitably within the ligand chain bridging between metal atoms. In other words, the azo or ethene group is not pendant to the main chain of the ligand.

In some embodiments, suitable ligands may be selected from the following structures:
A. $L^a$-$X^a$—Ar—N═N—Ar—$X^a$-$L^a$
B. $L^b$-$X^b$—CH═CH—$X^b$-$L^b$
C. $L^c$-$X^c$-oligothiophene-$X^c$-$L^c$.

in which each of $L^a$, $L^b$ and $L^c$ is independently a co-ordination linking group capable of co-ordinating with the metal atom, $X^a$ is a direct bond, or a chain comprising one group, or a sequence of groups, selected from the group consisting of substituted or unsubstituted aryl and —N═N—, provided that any —N═N— group does not immediately adjoin any other —N═N— group;

$X^b$ is a direct bond, or a chain comprising one group, or a sequence of groups, selected from the group consisting of substituted or unsubstituted aryl and —CH═CH—;

$X^c$ is a direct bond, or a chain comprising one group, or a sequence of groups, selected from the group consisting of substituted or unsubstituted aryl, —N═N— and —CH═CH—, provided that any —N═N— group does not immediately adjoin any other —N═N— group;

Ar is a substituted or unsubstituted aryl; and "oligothiophene" is a substituted or unsubstituted oligothiophene comprising from 2 to 8 thiophene units.

It is noted that in the above ligand definitions, the bond attachment through the aromatic rings or the thiophene units is through any suitable ring atom. It is also noted that the $X^a$ at the end of each molecule may be of a different definition, although in some embodiments, both $X^a$'s are the same. This applies equally for $X^b$ and $X^c$.

Where reference is made to substitution, suitable substitutents may be selected from the group consisting of: —H, —NH$_2$, —BR, —Cl, —NO$_2$, —CH$_3$, —OCH$_2$R$_1$, and —O—CH$_2$R$_2$, wherein R$_1$ is an alkyl or alkene of from about 1-5 carbons, and R$_2$ is an aryl or substituted aryl. Substitutents on the aryl group in the case or R$_2$ may be selected from the group consisting of —H, —NH$_2$, —BR, —Cl, —NO$_2$, —CH$_3$, and —OCH$_2$R$_1$. Alkyl refers to C1-C6 straight chain, branched or cyclic alkyl, including methyl, ethyl, propyl, tert-butyl and so forth. Alkene refers to C2-C6 straight chain or branched alkenes, including 1-propene, 1-butene, 1,3-butadiene, and so forth.

$L^a$, $L^b$ and $L^c$ each represent a co-ordination linking group capable of co-ordinating with the metal atom. Such groups are sometimes referred to as "linkers" in the art. The range of groups containing this function include carboxylate groups and N-donor rings such as imidazole, pyrazole, pyridyl and triazole, carbamate, thiocarbamate and so forth. The N-donor rings may be substituted or unsubstituted. The substituents may be selected from the group consisting of —H, —NH$_2$, —BR, —Cl, —NO$_2$, —CH$_3$, and —OCH$_2$R$_1$. In some embodiments, the N-donor ring is unsubstituted.

According to some embodiments, each of $L^a$, $L^b$ and $L^c$ is independently selected from the group consisting of carboxylate and pyridyl rings. In some embodiments, $L^a$ is carboxylate. In some embodiments, $L^c$ is carboxylate. In some embodiments, $L^b$ is pyridyl.

$X^a$ is a direct bond, or a chain comprising one group, or a sequence of groups, selected from the group consisting of substituted or unsubstituted aryl and —N═N—. According to some embodiments, $X^a$ comprises an alternating series of substituted or unsubstituted aryl groups and —N═N—. According to some embodiments, $X^a$ comprises one or a sequence of substituted or unsubstituted aryl groups. In some embodiments, $X^a$ is sequence of substituted or unsubstituted phenyl groups. In some embodiments, the number of aryl groups is between 2 and 5. In some embodiments, $X^a$ is a sequence of between 2 and 5 phenyl groups. According to some embodiments, $X^a$ is a substituted or unsubstituted aryl. In some embodiments, $X^a$ is substituted or unsubstituted phenyl. In some embodiments, $X^a$ is phenyl. As noted above, $X^a$ at each end of the molecule may be the same or different. When different, one $X^a$ may be denoted $X^{a'}$, and $X^{a'}$ has the same definition as for $X^a$. According to some embodiments, each $X^a$ is the same.

$X^b$ is a direct bond, or a chain comprising one group, or a sequence of groups, selected from the group consisting of substituted or unsubstituted aromatic rings and —CH═CH—. According to some embodiments, $X^b$ is a direct bond. According to some embodiments, $X^b$ is one or a sequence of substituted or unsubstituted aryl groups. According to some embodiments, $X^b$ comprises an alternating series of substituted or unsubstituted aryl groups and —CH═CH—. In some embodiments, $X^b$ is sequence of substituted or unsubstituted phenyl groups. In some embodiments, the number of aryl groups is between 2 and 5. In some embodiments, $X^b$ is a sequence of between 2 and 5 phenyl groups. According to some embodiments, $X^b$ is a substituted or unsubstituted aryl. In some embodiments, $X^b$ is substituted or unsubstituted phenyl. In some embodiments, $X^b$ is phenyl. As noted above, $X^b$ at each end of the molecule may be the same or different. When different, one $X^b$ may be denoted $X^{b'}$, and $X^{b'}$ has the same definition as for $X^b$. According to some embodiments, each $X^b$ is the same.

$X^c$ is a direct bond, or a chain comprising one group, or a sequence of groups, selected from the group consisting of substituted or unsubstituted aryl, —N═N— and —CH═CH—. According to some embodiments, $X^c$ is a direct bond. According to other embodiments, $X^c$ is one or a sequence of substituted or unsubstituted aryl groups. According to some embodiments, $X^c$ comprises an alternating series of substituted or unsubstituted aryl groups and —CH═CH—. In some embodiments, $X^c$ is sequence of substituted or unsubstituted phenyl groups. In some embodiments, the number of aryl groups is between 2 and 5. In some embodiments, $X^c$ is a sequence of between 2 and 5 phenyl groups. According to some embodiments, $X^c$ is a substituted or unsubstituted aryl. In some embodiments, $X^c$ is substituted or unsubstituted phenyl. In some embodiments, $X^c$ is phenyl. As noted above, $X^c$ at each end of the molecule may be the same or different. When different, one $X^c$ may be denoted $X^{c'}$, and $X^{c'}$ has the same definition as for $X^c$. According to some embodiments, each $X^c$ is the same.

The term "aryl" used either alone or in compound words such as "substituted aryl", denotes single, polynuclear, conjugated and fused residues of aromatic hydrocarbons or aromatic heterocyclic ring systems. Examples of aryl include phenyl, biphenyl, terphenyl, quaterphenyl, phenoxyphenyl, naphtyl, tetrahydronaphthyl, anthracenyl, dihydroanthracenyl, benzanthracenyl, dibenzanthracenyl, phenanthrenyl, fluorenyl, pyrenyl, indenyl, azulenyl, chrysenyl, pyridyl, 4-phenylpyridyl, 3-phenylpyridyl, thienyl, furyl, pyrryl, pyrrolyl, furanyl, imadazolyl, pyrrolydinyl, pyridinyl, piperidinyl, indolyl, pyridazinyl, pyrazolyl, pyrazinyl, thiazolyl, pyrimidinyl, quinolinyl, isoquinolinyl, benzofuranyl, benzothienyl, purinyl, quinazolinyl, phenazinyl, acridinyl, benzoxazolyl, benzothiazolyl and the like. According to some embodiments, the aryl is a carbocyclic aryl group. According to alternative embodiments, the aryl is heteroaryl and contains 1 to 4 heteroatoms independently selected from N, O and S. According to some embodiments, the aryl group contains a single ring (and therefore excludes fused ring systems). According to some embodiments, the aryl is phenyl or substituted phenyl. According to some embodiments, the aryl is an unsubstituted aryl, such as phenyl.

The oligothiophene may be a dithiophene. The bonding between the thiophene rings may be 4,4', or 2,5' or otherwise.

The MOF preferably comprises two different ligands.

In some embodiments, the MOF comprises a ligand of structure A and a ligand of structure B. In some embodiments, the MOF comprises a ligand of structure A and a ligand of structure C. In some embodiments, the MOF comprises a ligand of structure B and a ligand of structure C.

It will be understood that the relative number of ligands per metal atom may be uneven.

Thus, in some embodiments, the MOF may be of the formula:

Ligand 1 refers to a ligand of a first type, and Ligand 2 to a ligand of a second type. Ligand 1 may be of structure A, and Ligand 2 of structure B, as described previously. Thus, the MOF may be of the formula $M(A)(B)_{0.5}$. Other combinations of ligands A, B and C are possible.

The MOF may comprise paddlewheel dinuclear $M_2$ units, with bridging by Ligand 1, and pillars formed by Ligand 2. Ligand 1 may be a di-anionic ligand, such as a dicarboxylate ligand, and Ligand 2 may be a di-N-donor ring containing ligand, such as a dipyridyl ligand.

The MOF preferably is able to release at least 40%, preferably at least 45%, at least 50%, at least 55%, at least 60% or at least 65% of the adsorbed (separated) first gas species. The MOFs studied in the examples was capable of 69% release of the adsorbed gas species. Thus, the process of the present application may comprise:

releasing at least 40% of the separated first gas species from the gas separation material by switching the conformation of the metal organic framework to the second conformation.

The amount may be even greater, as indicated by the preferred percentages of gas release indicated previously.

The first gas species may be carbon dioxide. The gas stream will comprise a second (and possibly further) gas species. The second gas species may be selected from the group consisting of $N_2$, $O_2$, $H_2$, CO, $CH_4$ and so forth, including combinations thereof. According to other embodiments, the first gas species is one of $N_2$, $O_2$, $H_2$, CO or $CH_4$. The first gas species is selectively separated from the second gas species in the gas stream, such that at least 90%, or at least 95%, at least 99% or 100% of the adsorbed gas species is the first gas species.

The gas stream may be an exhaust gas stream, such as a power plant exhaust gas stream.

Studies on $Zn(AzDC)(4,4'-BPE)_{0.5}$

Figure 10:
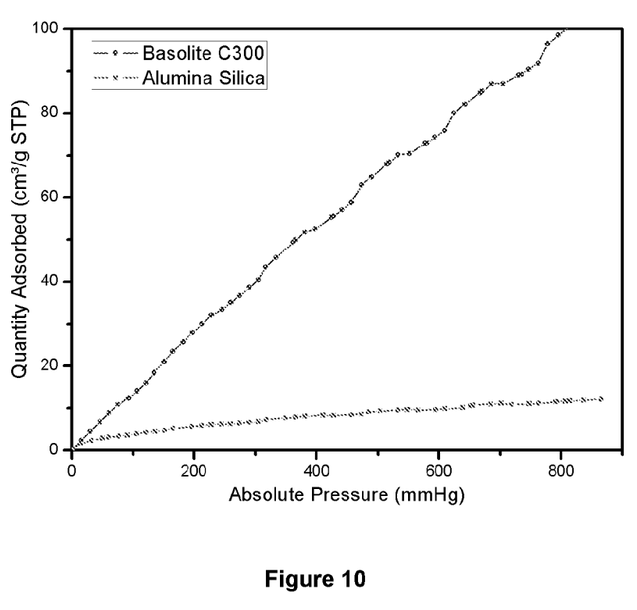
FIG. 10 is a graph of gas adsorption isotherms for control experiments using non-photoactive materials to verify the effect of light on $Zn(AzDC)(4,4-BPE)_{0.5}$. The $CO_2$ adsorption isotherm at 303 K of Basolite C300 is reflected by the line connecting the circle points, and of Silica Alumina is reflected by the line connecting the square points.

The synthesis of the triply interpenetrated framework $Zn(AzDC)(4,4'-BPE)_{0.5}$ and studies on its properties are set out in the Examples below. The framework is assembled from paddle wheel dinuclear $Zn_2$ units, bridging AzDC di-anions and 4,4'-BPE pillar ligands. Photoresponsive studies in solid state revealed a photoactive framework. Trans- and cis-AzDC n-π* (S1 state) and π-π* (S2 state) transitions can be detected at 455 nm and 380 nm in the excitation spectra respectively (FIG. 10). The coordination of 4,4'-BPE to Zn results in a photoactive species under light irradiation. The trans isomer of 4,4'-BPE ligand exhibits overlapping excitation bands of metal to ligand charge transfer and intra-ligand charge transfer in the 310-375 nm region. Excitation in this region generates trans→cis isomerisation. Both cis-AzDC and 4,4'-BPE can return to their trans state.

Figure 2:
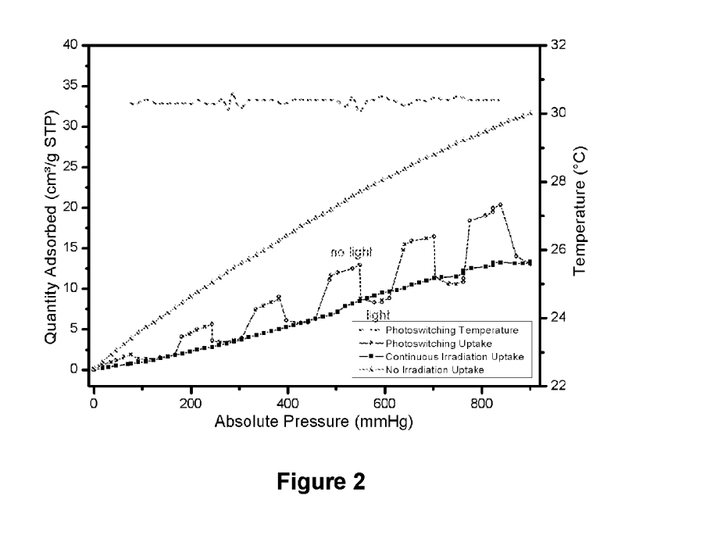
FIG. 2 is a graph of the $CO_2$ adsorption isotherms of $Zn(AzDC)(4,4'-BPE)_{0.5}$ at 303 K in the presence of light (squares), absence of light (triangles) and unfiltered light switching environment (circles). Temperature fluctuations were not observed during the light switching experiment. The light intensity was fixed at 24.6 W cm$^{-2}$ in the wavelength range (200-500 nm).

As shown in FIG. 2, $Zn(AzDC)(4,4'-BPE)_{0.5}$ exhibits unprecedented dynamic switching under $CO_2$ adsorption, with a 240% variation in capacity under static irradiation conditions, and as much as 69% during dynamic measurements. Dynamic irradiation isotherms follow values obtained under continuous conditions, however the reversal in uptake was not entirely complete under the dynamic measurement conditions employed. A series of careful control experiments were undertaken to ensure that this phenomenon was not an experimental or material artefact, but due solely to the dynamic photo-response observed. Careful localized temperature monitoring showed that the temperature varied by less than 0.2° C., ruling out localized heating as a significant effect. Furthermore, experiments with control materials including—SAPO 34 zeolite, and also a framework without photoactive groups, Cu-BTC, showed almost no $CO_2$ uptake variations (0.2-2% vs 69% for Zn(AzDC)(4,4'-BPE)0.5), see FIG. 12. To the best of our knowledge, this MOF exhibits the strongest light response reported to date. In the only comparable experiment, conducted under static conditions, a 30% uptake fluctuation was observed.

Figure 3:
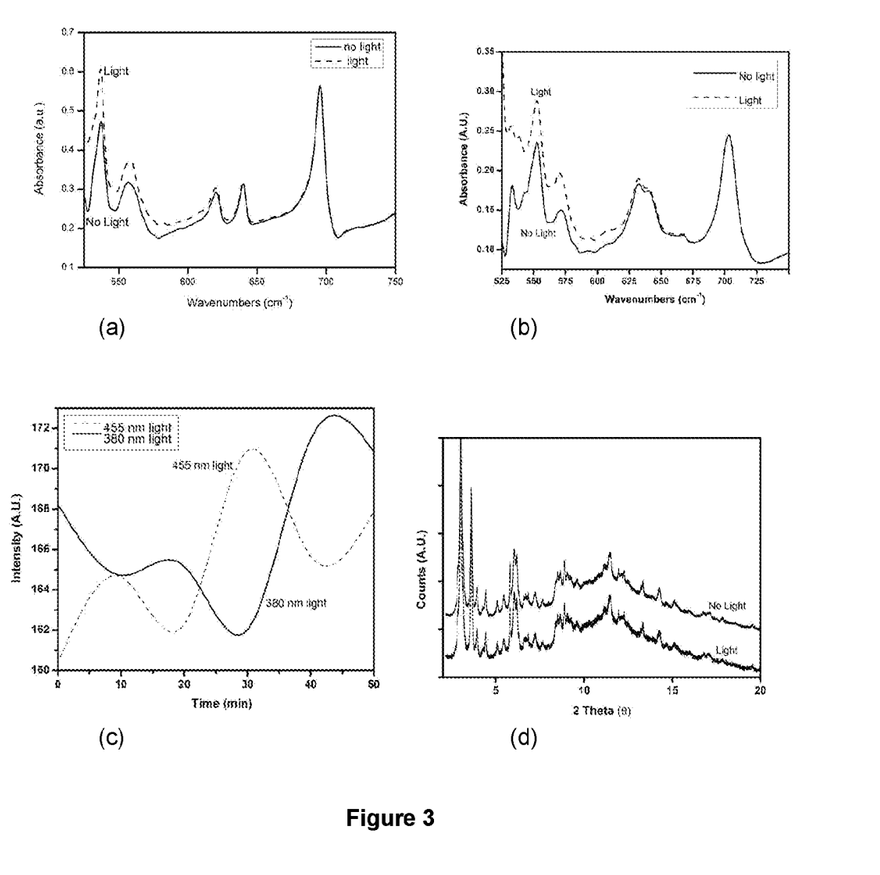
FIG. 3 is a series of graphs demonstrating C—C—C and C—C—N low energy FTIR bending modes in AzDC which were found to be excited by UV in both the ligand (see graph (a)) and the in the MOF $Zn(AzDC)(4,4'-BPE)_{0.5}$ (see graph (b)). Graph 3(c), which is a graph of the intensity of oscillation of trans (solid line) and cis (dashed line) MOF upon prolonged exposure to 380 nm and 455 nm light, demonstrates that continual irradiation of the MOF led to oscillations between native and excited states witnessed with UV-Vis absorption. Free 4,4'-BPE in the solid state was found to be non-photoactive. Graph 3(d) is shows the results of the synchrotron PXRD experiments, which confirm that the transitions were local and dynamic, since no periodic changes are revealed.

FIG. 3 shows that significant changes in peak intensity for the region 540-700 $cm^{-1}$ were observed under irradiation, whereas the remaining spectrum was unchanged. Peak intensity increase at 550 $cm^{-1}$ can be attributed to C—C—C and C—C—N bending modes with AzDC, indicating low energy structural variations about the azo group, which occurred due to the suppression of cis-trans isomerisation. These bending modes are likely to be responsible for the spontaneous release of adsorbed $CO_2$ upon irradiation, in which the pore surface was activated and the surface energy was increased (FIG. 3b). Similar experiments on the free ligand AzDC confirmed this effect (FIG. 3a). An increase in intensity at 537 $cm^{-1}$ indicated the activation of bending modes about the C—C—N bonds within the ligand. Furthermore, very minor peak increases in the free ligand at 1516 $cm^{-1}$ were observed, assigned to higher energy cis-N=N stretching modes forming as the native trans material was excited. These modes were not seen to change within the framework, highlighting the restricted nature of AzDC in this structure, which could not undertake these transitions. This also explains why no changes were seen in XRD (FIG. 3d). This result was also replicated with similar UV-Vis experiments, where only a small fraction of cis isomers were detected (FIG. 3c). The framework was continuously exposed to either 365 nm or 460 nm light and the intensity of the absorption peak is monitored. Absorption related to trans-AzDC and cis-AzDC moieties was found to be complementary and also periodically changing, regardless of whether the excitation wavelength promoted formation of either cis or trans structures. Under continuous irradiation from either 370 nm (promote cis-AzDC) or 460 nm light (promote trans-AzDC), small fractions of the structure were found to periodically oscillate between both isomeric conformations in a complementary fashion given the additive nature of cis- and trans-peaks across the two separate experiments. Similar additive effects were less clear from 4,4'-BPE excitation profiles where there was considerable overlap, although this ligand also clearly underwent transitions whilst coordinated within the framework. Most likely, this continual reversion to native states even under irradiation that promotes an isomeric transformation stems from the structural stresses induced within the interpenetrated framework, due to the components also being critical to the topology, and not pendant to it. Furthermore, rapid changes predominantly through bending motions must occur throughout the framework in order to maintain the original triply interpenetrated framework and accommodate the constraints.

Figure 4:
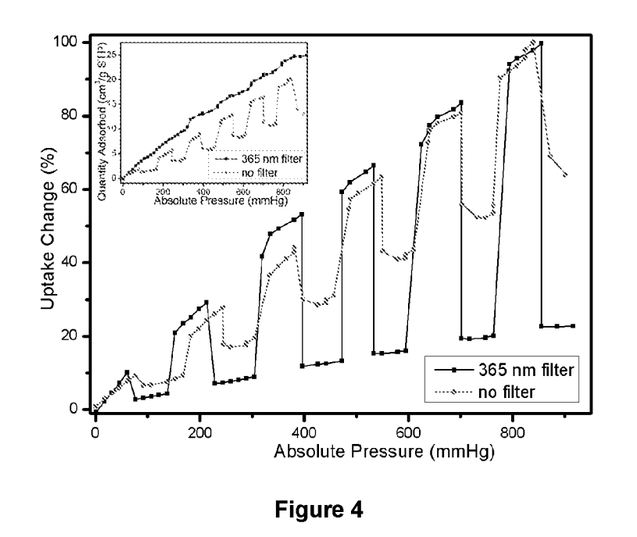
FIG. 4 is a graph of the photoswitching performance according to light wavelength, adjusted for variation in flux. 365 nm filtered light is optimised for cis-trans photoisomerisation of both AzDC and BPE ligands, which are ligands of the MOF of one embodiment.

FIG. 4 shows that absolute $CO_2$ uptake is increased and the amount released upon light exposure lessened when a filtered light source, which has a lower flux, is used. Filtering the light to 365 nm promotes photoisomerisation in both the AzDC and BPE ligands (FIGS. 10 and 11). Accounting for variations in raw uptake amounts, and changing flux gives FIG. 4. Here it is shown that the efficiency of $CO_2$ release is greatly enhanced by the use of 365 nm filtered light. In both cases the adsorption amounts in the absence of light irradiation are similar, yet $CO_2$ desorption is found to be more efficient with use of filtered 365 nm radiation. This effect is most pronounced at high partial pressures, yet it is notable that at partial pressures similar to those encountered in post-combustion capture gas streams (ca. 115 mmHg) that unfiltered light gives a very comparable response. The results imply that in cases where light intensity is not a limiting factor, that filtration to 365 nm is preferable, but in other instances, unfiltered, concentrated sunlight will also perform almost as well, especially in post combustion capture streams. Illuminations up to 20 W/$cm^2$ (200 solar equivalents) can be achieved using concentrated sunlight. These remarkable results stem from the fact that the photo-induced structural changes in Zn(AzDC)(4,4'-BPE)$_{0.5}$ are dynamic.

The foregoing results demonstrate that the interpenetrated framework Zn(AzDC)(4,4'-BPE)$_{0.5}$ can undergo dynamic light-induced structural flexibility, which results in large variations in $CO_2$ uptakes. For the first time an experimental protocol was established to exploit this remarkable property for low energy $CO_2$ capture and release. The variation in $CO_2$ capture performance was found to be exceptionally strong, as much as 69% under dynamic measurements, increasing to 240% in static conditions. Characterisation of the framework showed that the structural flexibility is due to both the AzDC and BPE ligands, occurring reversibly and on a local scale, even under irradiation that would promote formation on just one conformer. This is akin to a twisted rope that spontaneously unwinds when sufficiently twisted.

This approach represents a route to renewable energy $CO_2$ capture and release, and was found to remain effective under broadband irradiation. This means that unfiltered sunlight may be used instead of the energy intensive temperature and pressure swings to release trapped gases.

The present invention will now be described in further detail with reference to the following non-limiting examples which demonstrate the principles underlying the present invention.

EXAMPLES

Section 1

Experimental Procedures S1

S1.1 Synthesis of AzDC (1)—"Ligand 1"

4-Nitrobenzoic acid (15.0304 g, 0.09 mol) was dissolved into an aqueous sodium hydroxide solution (51.0039, 1.28 mol, in 225 ml water) by heating the solution. A hot aqueous glucose solution (101.0159 g, 0.56 mol, in 150 ml water) was slowly added into the above solution at 50° C., in which the initially formed yellow precipitate immediately turned into a brown solution upon further addition of glucose. The mixture was allowed to react overnight at room temperature to form a dark solution. Methanol was added to the aged solution until a bright brown precipitate formed. The filtered precipitate was dissolved in water, followed by acidification with acetic acid (20 mL), whereupon a light pink precipitate was obtained. The product was filtered, washed with excess water and dried overnight to yield the final product (4.92 g, 17 mmol, 38.5%). $^1$H NMR (DMSO, 400 MHz): δ (ppm) 8.04-8.06 (d, 4H), δ 8.18-8.20 (d, 4H), δ 13.0 (brs, 1H). $^{13}$C NMR (DMSO, 500 MHz): 122.86, 130.72, 133.50, 154.17, 166.67.

S1.2 Synthesis of Zn(AzDC)(4,4-BPE)$_{0.5}$ (2)—"Framework 2"

Framework 2 was solvothermally synthesized according to a general procedure described by Zhou et al. B. Chen, S. Ma, E. J. Hurtado, E. B. Lobkovsky, H.-C. Zhou, *Inorganic Chemistry* 2007, 46, 8490-8492. A mixture of Zn(NO$_3$)$_2$.6H$_2$O, 1 and 4,4'-BPE was suspended in DMF (100 mL) and heated at 100° C. for 24 h. The resulting red block-shaped crystals formed were filtered and washed with DMF and hexane, and dried in air.

BET surface area: 126.4575 $m^2$/g.

Section 2

Gas Adsorption Measurement S2

S2.1 General Gas Adsorption Procedures

Figure 5:
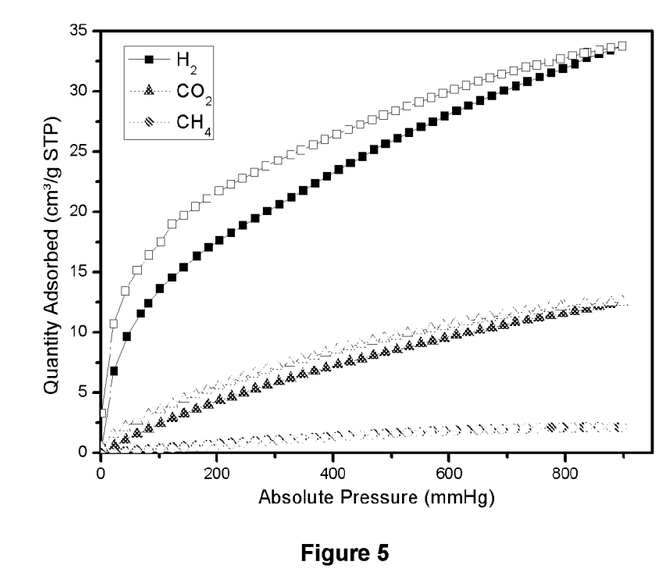
FIG. 5 is a graph of the gas adsorption isotherms of $Zn(AzDC)(4,4'-BPE)_{0.5}$ at 77 K (hydrogen, squares) and 298 K (carbon dioxide, triangles; and methane, circles).

Gas adsorption isotherms of activated Framework 2 were recorded at low pressure (0-1.2 bar) by a volumetric method using a Micromeritics ASAP 2040 instrument. Approximately 100 mg of dried methanol exchanged sample was weighed in a pre-dried and weighed Quartz BET tube. The sample was evacuated and activated at 150° C. under dynamic vacuum at $10^{-6}$ Torr for at least 24 h to remove any solvent molecules. An accurate weight of the degassed sample was calculated prior to analysis. Gas adsorption measurements were performed using ultra-high purity $H_2$, $CO_2$ and $CH_4$ gas. The gas adsorption isotherms are shown in FIG. 5.

Section 3

X-Ray Powder Diffraction (PXRD) S4

S3.1 General PXRD Procedure

PXRD data was recorded using a Bruker D8 Advance X-ray Diffractometer with CuKa radiation (40 kV, 40 mA) monochromatised with a graphite sample monocromator was employed to determined the X-ray diffraction patterns. Each sample was scanned over the 2-theta range 5 to 85° with a step size of 0.02° and a count time of 4 seconds per step. The PXRD pattern broadens when the as synthesized 2 is solvent exchanged with dry methanol. This is a typical feature of the interpenetrated frameworks as the slight change in the structure resulted from the changes in guest content and composition.

S3.2 Photo-Response PXRD Patterns

Figure 6:
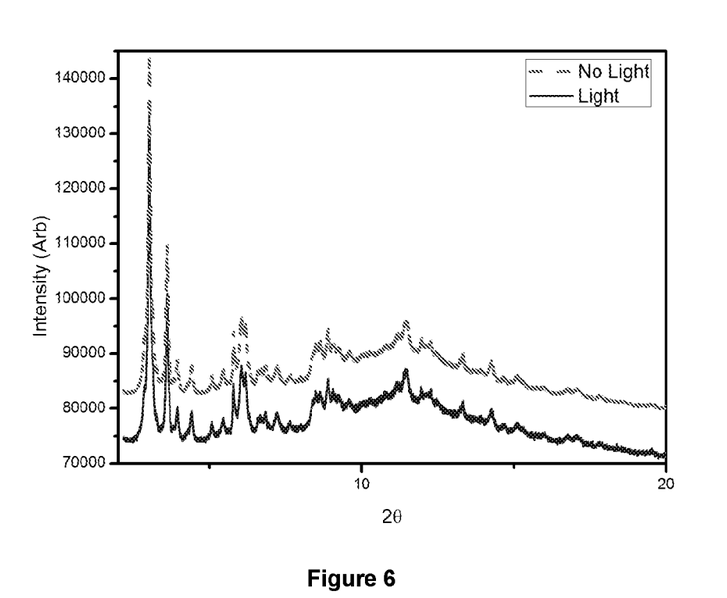

PXRD data was obtained using the powder diffraction beamline at the Australian Synchotron with an incident wavelength of 1.00 Å. The sample was sealed in a 0.3 mm diameter quartz capillary and examined over the range of $2 < 2\theta < 82$. Using Acticure® 4000 as the UV-VIS light source, the sample was irradiated with light throughout the measurement. The results are shown in FIG. 6.

S3.3 X-Ray Crystal Structure

Figure 7:
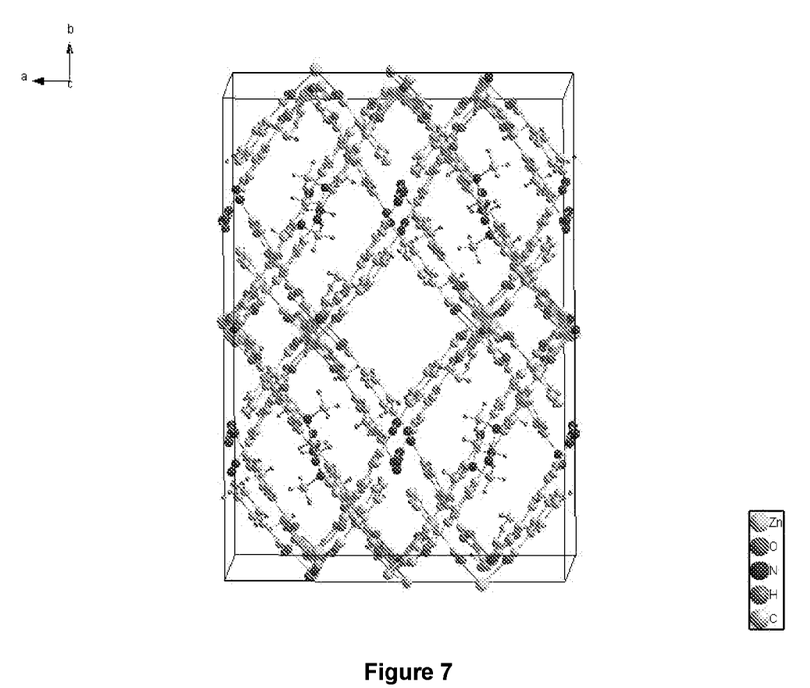
FIG. 7 shows the crystal structure of $Zn(AzDC)(4,4'-BPE)_{0.5}$.

Crystal unit cell structure of 2 was constructed using Diamond v3.1. This is shown in FIG. 7.

Section 4

Photo-Response Characterisation S5

S4.1 General Photo-Response Characterization Procedure

Figure 8:
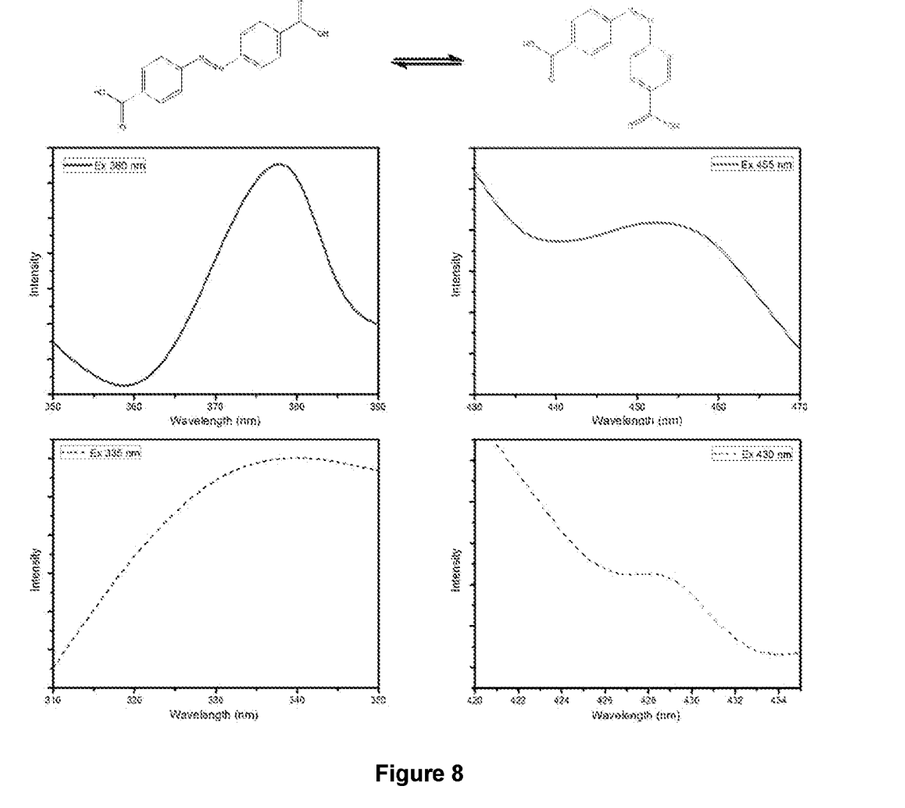
FIG. 8 shows the excitation spectra of AzDC ligand in $Zn(AzDC)(4,4'-BPE)_{0.5}$ (solid line) and free AzDC ligand (dashed line) with an emission wavelength of 370 nm (left side spectra) and 460 nm (right side spectra).
Figure 9:
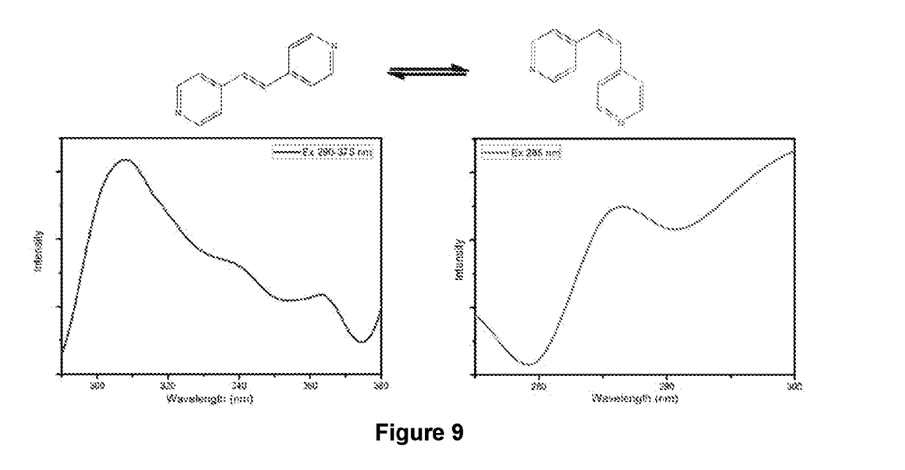
FIG. 9 shows the excitation spectra of 4,4'-BPE of $Zn(AzDC)(4,4'-BPE)_{0.5}$ with an emission wavelength of 250 nm (left side) and 370 nm (right side).

Excitation and emission wavelengths of the sample in solid state were read in a Corning black flat clear bottom microplate using FlexStation® 3 Benchtop Multi-Mode Microplate Reader in fluorescence bottom reading mode at room temperature. The excitation spectra of $A_zDC$ is shown in FIG. 8. The excitation band at 380 nm and 455 nm is due to the trans and cis AzDC in 2 respectively. The peak around 330 nm and 430 nm is charastic of the trans and cis free AzDC ligand respectively. FIG. 9 shows the excitation spectra of the ligand 4,4'BPE. The excitation wavelengths at the 300 nm region and 285 nm correspond to the trans and cis peaks respectively. Free BPE was found to have no photoactivity in the solid state.

Section 5

Light-Responsive Control Experiments S6

S5.1 General Light-Responsive Control Procedure

Basolite C300 and Silica Alumina were chosen as non-photoactive porous materials for a control study. Approximately 1 mg of degassed sample was used in Quartz BET tube. Basolite C300 was activated at 150° C. for 24 h and Silica Alumina was activated at 90 for 1 h, then at 350 C for 5 h. The experiment was conducted by switching the unfiltered light on and off throughout the analysis. The gas adsorption isotherms are shown in FIG. 10. Basolite C300 and Silica Alumina show up to approximately 0.2% and 2% responsiveness respectively. In comparison to the 69% response in $Zn(AzDC)(4,4-BPE)_{0.5}$, the response is very low. This is due to the sudden change in condition when the light was switched on.

Section 6

Light-Responsive Gas Adsorption Experimental Setup S7

S6.1 General Light-Responsive Gas Adsorption Experimental Setup

Figure 13:
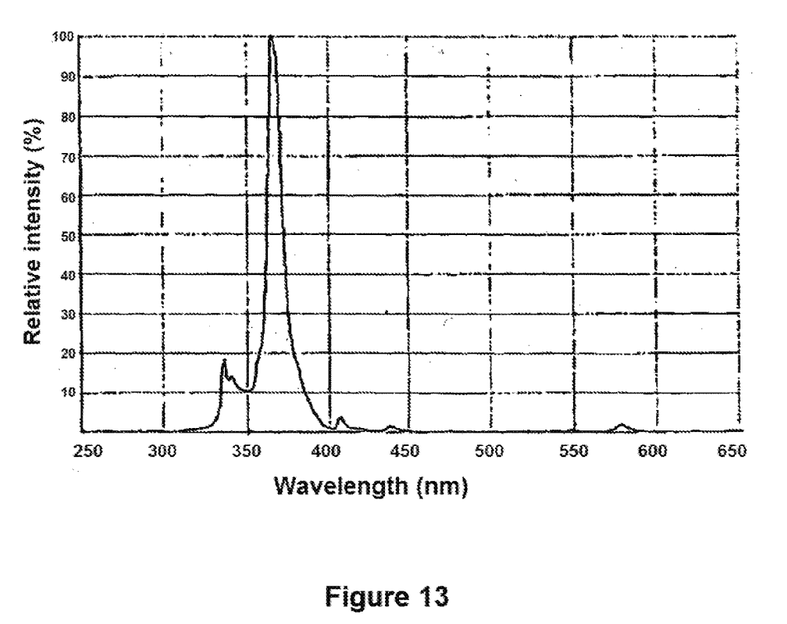
FIG. 13 is a graph of the spectral output of light using the 365 nm filter.

Pre-weighed and dried custom made aluminium foiled quartz BET tube was used for light experiment. A custom made BET light cell was used to contain the BET tube and light guide to allow maximum light exposure and coverage on the sample when the light was switched on. A Cole Palmer Model BT 15 heated circulating bath was used to maintain the temperature at 303 K or 273 K throughout the experiment. A temperature probe was wedged inside the light cell between the quartz BET tube and light guide to monitor the temperature. Acticure® 4000 was used as a UV-VIS light source to trigger sample's light response during analysis. The light was fixed at the highest intensity output with no filter (200-500 nm) (24,600 mWcm$^{-2}$) and 365 nm filter (5,600 mW/cm$^2$). The spectral output for light filtered with a 365 nm filter is shown in FIG. 13.

Section 7

Gas Separation Device Setup S7

Figure 11A:
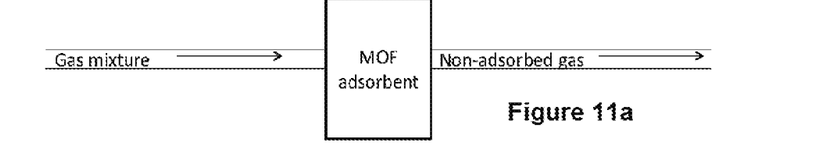
Figure 11B:
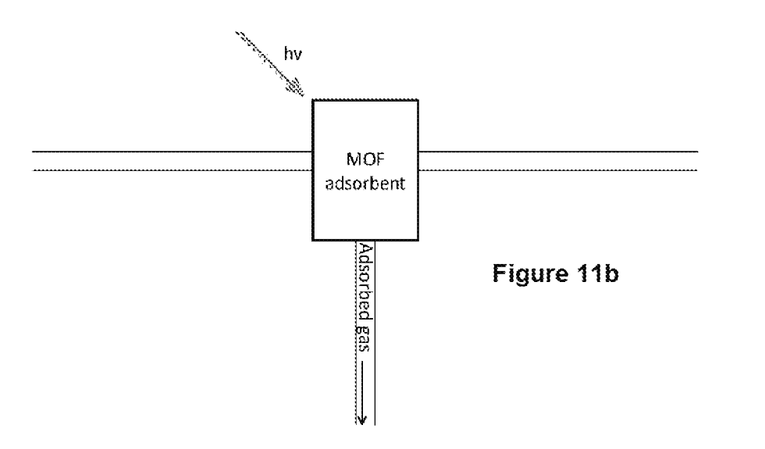

The separation process is illustrated schematically in FIG. 11. In the absence of the activating light (FIG. 11a), a gas stream containing a first (target) gas species, comes into contact with the MOF adsorbent, while the MOF is in a first conformation that allows the target gas species to be captured. The non-adsorbed gas continues through the adsorbent, as illustrated. Then, as shown in FIG. 11b, the separated gas species is released from the gas separation material by irradiating the MOF with light (hv) which results in switching of the conformation of the metal organic framework to the second conformation which forces the gas species out of the material. The MOF may be located within an arrangement that includes an adsorbed gas release passageway, which can be opened so as to channel the adsorbed (and released) gas species in a different direction to the non-adsorbed gas. The non-adsorbed gas species passageway can be closed during this operation. After removal of the adsorbed gas species, the MOF is regenerated and ready for use in the adsorption of more of the first gas species.

Figure 12:
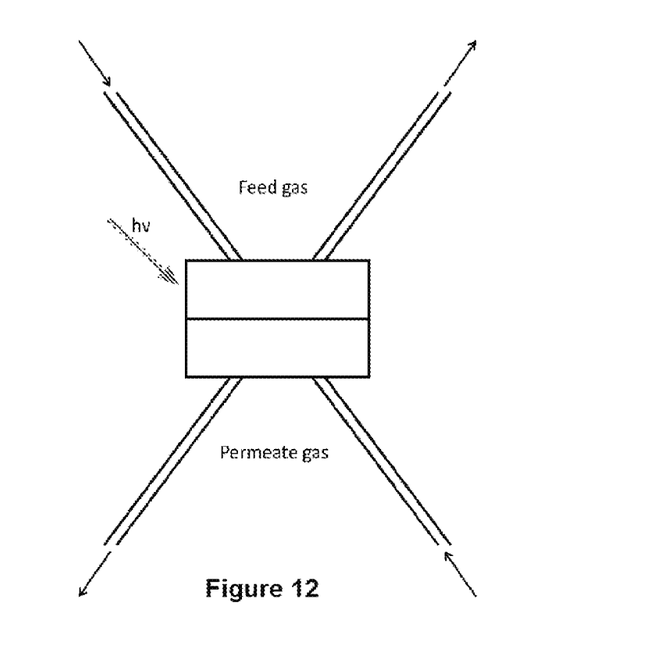
FIG. 12 is a schematic illustration of a gas separation device in the form of a cartridge being used the process of one embodiment.

One specific arrangement for the gas separation device is illustrated in FIG. 12. In FIG. 12, the gas separation device comprising MOF adsorbent is in the form of a cartridge that is positioned in a cartridge receiver within a gas stream. Feed gas passes through the cartridge in the absence of light, during which time the MOF is in a first conformation that allows the target gas species to be captured, and the non-adsorbed gas flows through the cartridge (in the direction illustrated by the arrow headed to the top right hand corner). Then the separated gas species is released from the gas separation material by irradiating the MOF with light (hv) while a permeate gas is channelled through the cartridge, allowing the separated gas to be drawn out of the MOF in the cartridge and out of the MOF in the permeate gas stream. After removal of the adsorbed gas species, the MOF is regenerated and ready for use in the adsorption of more of the first gas species.

The invention claimed is:

1. A process for the separation of a first gas species from a gas stream using a gas separation material comprising a metal organic framework that is reversibly switchable between a first conformation that allows the first gas species to be captured in the metal organic framework, and a second conformation that allows the release of the captured first gas species on the use of light as the switching stimulus, the metal organic framework comprising at least one ligand containing an isomerisable group within the molecular chain that forms a link between adjacent metal atoms in the metal organic framework, and the process comprising:
   contacting a gas stream containing the first gas species with the gas separation material comprising the metal organic framework in the first conformation to capture the first gas species,
   releasing the separated first gas species from the gas separation material by switching the conformation of the metal organic framework to the second conformation, and
   switching the metal organic framework to the first conformation to regenerate the gas separation material.

2. The process of claim 1, wherein the metal organic framework comprise a metal and one or more ligands.

3. The process of claim 2, wherein the metal organic framework comprises one or more ligands containing a photoisomerisable group enabling reversible isomerisation between the cis- and trans-state within the molecular chain bridging between metal atoms.

4. The process of claim 2, wherein the metal organic framework comprises one or more ligands containing a photoisomerisable azo or ethene bond enabling reversible isomerisation between the cis- and trans-state within the molecular chain bridging between metal atoms.

5. The process of claim 2, wherein the metal organic framework comprises two different ligands each comprising a photoisomerisable azo or ethene bond enabling reversible isomerisation between the cis- and trans-state within the molecular chain bridging between metal atoms.

6. The process of claim 2, wherein the metal is selected from the group consisting of: Sc, Ti, V, Cr, Mn, Fe, Co, Ni, Cu, Zn, Y, Mg, Ca, Sr, Ba, Zr, Ti, La, Ce, Pr, Nd, Pm, Sm, Eu, Gd, Tb, Dy, Ho, Er, Tm, Yb and Lu, and combinations thereof.

7. The process of claim 6, wherein the metal species is selected from the group consisting of Zn, Y, Mg, Ca, Sr, Ba, Zr, and Ti.

8. The process of claim 2, wherein the ligands are selected from the following structures:
   A. $L^a$-$X^a$—Ar—N=N—Ar—$X^a$-$L^a$
   B. $L^b$-$X^b$—CH=CH—$X^b$-$L^b$
   C. $L^c$-$X^c$-oligothiophene-$X^c$-$L^c$ in which each of $L^a$, $L^b$ and $L^c$ is independently a co-ordination linking group capable of coordinating with the metal atom,
$X^a$ is a direct bond, or a chain comprising one group, or a sequence of groups, selected from the group consisting of substituted or unsubstituted aryl and —N=N—, provided that any —N=N— group does not immediately adjoin any other —N=N— group;
$X^b$ is a direct bond, or a chain comprising one group, or a sequence of groups, selected from the group consisting of substituted or unsubstituted aryl and —CH=CH—;
$X^c$ is a direct bond, or a chain comprising one group, or a sequence of groups, selected from the group consisting of substituted or unsubstituted aryl, —N=N— and —CH=CH—, provided that any —N=N— group does not immediately adjoin any other —N=N— group;
Ar is a substituted or unsubstituted aryl; and
oligothiophene is a substituted or unsubstituted oligothiophene comprising from 2 to 8 thiophene units.

9. The process of claim 8, wherein $L^a$, $L^b$ and $L^c$ are each independently selected from the group consisting of carboxylate and N-donor rings.

10. The process of claim 8, wherein $L^a$, $L^b$ and $L^c$ are each independently selected from the group consisting of carboxylate and pyridyl.

11. The process of claim 8, wherein $X^a$ is selected from the group consisting of aryl, substituted aryl, and a sequence of substituted or unsubstituted aryl groups.

12. The process of claim 11, wherein $X^a$ is substituted or unsubstituted phenyl.

13. The process of claim 11, wherein $X^a$ is phenyl.

14. The process of claim 8, wherein $X^b$ is a direct bond.

15. The process of claim 8, wherein the metal organic framework comprises a ligand of structure A and a ligand of structure B.

16. The process of claim 8, wherein the metal organic framework comprises a ligand of structure A and a ligand of structure C.

17. The process of claim 8, wherein the metal organic framework comprises a ligand of structure B and a ligand of structure C.

18. The process of claim 8, wherein the metal organic framework is of the formula $M(A)(B)_{0.5}$, in which M refers to a metal, and A and B are as defined in claim 8.

19. The process of claim 18, wherein the metal organic framework is $M(AzDC)(4,4'-BPE)_{0.5}$.

20. The process of claim 19, wherein the metal organic framework is $Zn(AzDC)(4,4'-BPE)_{0.5}$.

21. The process of claim 1, further comprising:
   reusing the regenerated gas separation material for the separation of the first gas species from the gas stream.

22. The process of claim 1, wherein the light is light of broadband wavelength.

23. The process of claim 1, wherein the light is sunlight.

24. The process of claim 1, wherein light is the only switching stimulus.

25. The process of claim 1, wherein the second conformation is achieved on application of light.

26. The process of claim 1, wherein the conformation that is achieved on application of light is a conformation that is under tension, and removal of the light results in spontaneous reversal to the structure of the other conformation.

27. The process of claim 1, wherein the metal organic framework is an interpenetrated metal organic framework.

28. The process of claim 1, wherein the MOF is able to release at least 40%, of the adsorbed first gas species when switched to the second conformation.

29. The process of claim 1, wherein the first gas species is carbon dioxide.

* * * * *